United States Patent
Campbell et al.

(10) Patent No.: US 8,911,008 B1
(45) Date of Patent: Dec. 16, 2014

(54) ACOUSTIC SPRAY FOAM CONTROL SYSTEM AND METHOD

(71) Applicant: Honda Motor Co., Ltd., Tokyo (JP)

(72) Inventors: Shawn W. Campbell, Dublin, OH (US); Aron K. Madsen, Marysville, OH (US); Robert G. ZumMallen, East Liberty, OH (US); Fabian J. Vigil, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/014,480

(22) Filed: Aug. 30, 2013

(51) Int. Cl.
*B60J 7/00* (2006.01)

(52) U.S. Cl.
USPC ................ 296/213; 296/187.02

(58) Field of Classification Search
CPC .................................... B60J 7/0084
USPC .......................... 296/213, 187.02
See application file for complete search history.

(56) References Cited

U.S. PATENT DOCUMENTS

| | | | |
|---|---|---|---|
| 4,440,434 A | | 4/1984 | Celli |
| 5,102,188 A | * | 4/1992 | Yamane ................ 296/205 |
| 5,344,208 A | | 9/1994 | Bien et al. |
| 5,755,486 A | | 5/1998 | Wycech |
| 5,979,902 A | | 11/1999 | Chang et al. |
| 6,272,809 B1 | | 8/2001 | Wycech |
| 6,337,355 B1 | * | 1/2002 | Yamashita et al. ............ 521/115 |
| 6,358,584 B1 | * | 3/2002 | Czaplicki .................... 428/36.5 |
| 6,413,611 B1 | | 7/2002 | Roberts et al. |
| 6,467,834 B1 | | 10/2002 | Barz et al. |
| 6,474,723 B2 | | 11/2002 | Czaplicki et al. |
| 6,482,486 B1 | | 11/2002 | Czaplicki et al. |
| 6,619,009 B2 | | 9/2003 | Lupini et al. |
| 6,619,727 B1 | | 9/2003 | Barz et al. |
| 6,641,208 B2 | | 11/2003 | Czaplicki et al. |
| 6,649,243 B2 | | 11/2003 | Roberts et al. |
| 6,866,331 B2 | | 3/2005 | Kropfeld |
| 6,896,320 B2 | | 5/2005 | Kropfeld |
| 6,928,736 B2 | * | 8/2005 | Czaplicki et al. ............ 29/897.2 |
| 7,077,460 B2 | | 7/2006 | Czaplicki et al. |
| 7,090,273 B2 | | 8/2006 | Stojkovic et al. |
| 7,097,794 B2 | | 8/2006 | Mcleod et al. |
| 7,111,899 B2 | | 9/2006 | Gray |
| 7,296,847 B2 | | 11/2007 | Czaplicki et al. |
| 7,479,246 B2 | | 1/2009 | Muteau et al. |
| 7,494,179 B2 | | 2/2009 | Deachin et al. |
| 7,726,442 B2 | * | 6/2010 | Belpaire ................ 181/237 |
| 7,838,100 B2 | | 11/2010 | Mcleod et al. |
| 8,087,916 B2 | | 1/2012 | Kanie et al. |
| 8,128,780 B2 | | 3/2012 | Czaplicki et al. |

(Continued)

FOREIGN PATENT DOCUMENTS

JP 2000-318641 * 11/2000

*Primary Examiner* — Dennis H Pedder
(74) *Attorney, Agent, or Firm* — Rankin, Hill & Clark LLP

(57) ABSTRACT

An acoustic spray foam control system and method are provided for a sunroof drain tube area in a vehicle. The system and method include an acoustic spray foam control baffle that is mounted within the sunroof drain tube area of the vehicle and a sunroof drain tube that is installed in the sunroof drain tube area by passing through the acoustic spray foam control baffle. The system and method also include acoustic spray foam that is injected into the sunroof drain tube area with flow of the acoustic spray foam controlled by the acoustic spray foam control baffle.

19 Claims, 10 Drawing Sheets

(56) References Cited

U.S. PATENT DOCUMENTS 8,444,214 B2 * 5/2013 Helferty et al. .......... 296/193.06
2006/0043772 A1 3/2006 Richardson
2013/0087406 A1 * 4/2013 Franey et al. ................ 181/264

* cited by examiner

ACOUSTIC SPRAY FOAM CONTROL SYSTEM AND METHOD

BACKGROUND

Dampening materials are presently used by many vehicle manufacturers to address NVH (noise, vibration and harshness) concerns in vehicles. The dampening material can be a foam installed inside a hollow cavity defined within the vehicle body. Sometimes such foam (e.g., spray foam) is injected into the hollow cavity within the vehicle body. When injecting the spray foam, many vehicle manufacturers do not attempt to contain the injected foam but rather allow it to be free flowing. In other applications, baffles are installed within the cavity of the vehicle body and each baffle includes an expandable foam portion or element (i.e., the foam is not injected). These types of baffles may be secured within the hollow cavity of the vehicle body via suitable fasteners and arranged to limit the flow of the expandable foam portion or element.

SUMMARY

According to one aspect, an acoustic spray foam control method is provided for a sunroof drain tube area in a vehicle. In accordance with this aspect, the method includes providing an acoustic spray foam control baffle configured for mounting within the sunroof drain tube area, installing the acoustic spray foam control baffle within the sunroof drain tube area, installing a sunroof drain tube into the sunroof drain tube area by passing the sunroof drain tube through the acoustic spray foam control baffle, and injecting an acoustic spray foam into the sunroof drain tube area with the acoustic spray foam control baffle controlling the flow of the acoustic spray foam within the sunroof drain control area.

According to another aspect, an acoustic spray foam control system for a sunroof drain tube area in a vehicle is provided. The acoustic spray foam control system includes an acoustic spray foam control baffle mounted within the sunroof drain tube area of the vehicle and a sunroof drain tube installed in the sunroof drain tube area by passing through the acoustic spray foam control baffle. The acoustic spray foam control system additionally includes an acoustic spray foam injected into the sunroof drain tube area with flow of the acoustic spray foam controlled by the acoustic spray foam control baffle.

According to a further aspect, an acoustic spray foam control baffle is provided for positioning within a pillar on a vehicle. The acoustic spray foam control baffle includes first and second end radial flanges for inhibiting dispersal of acoustic spray foam within a cavity defined in the pillar and a middle radial flange disposed between and spaced apart from the first and second end radial flanges. The acoustic spray foam control baffle additionally includes a first longitudinal section disposed between the first end radial flange and the middle radial flange, and a second longitudinal section disposed between the second end radial flange and the middle radial flange. The first, second and middle radial flanges define apertures for accommodating a sunroof drain tube.

DETAILED DESCRIPTION

Figure 1:
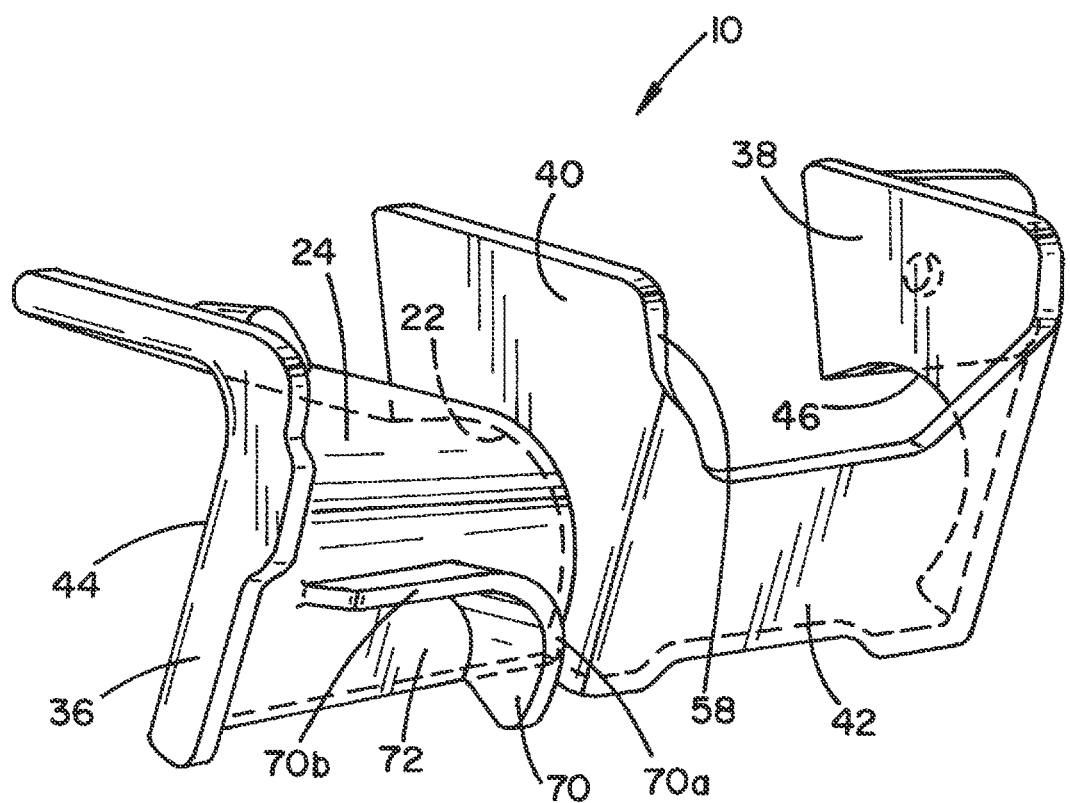
FIG. 1 is a perspective view of an acoustic spray foam control baffle for a sunroof drain tube area in a vehicle according to an exemplary embodiment.
Figure 7:
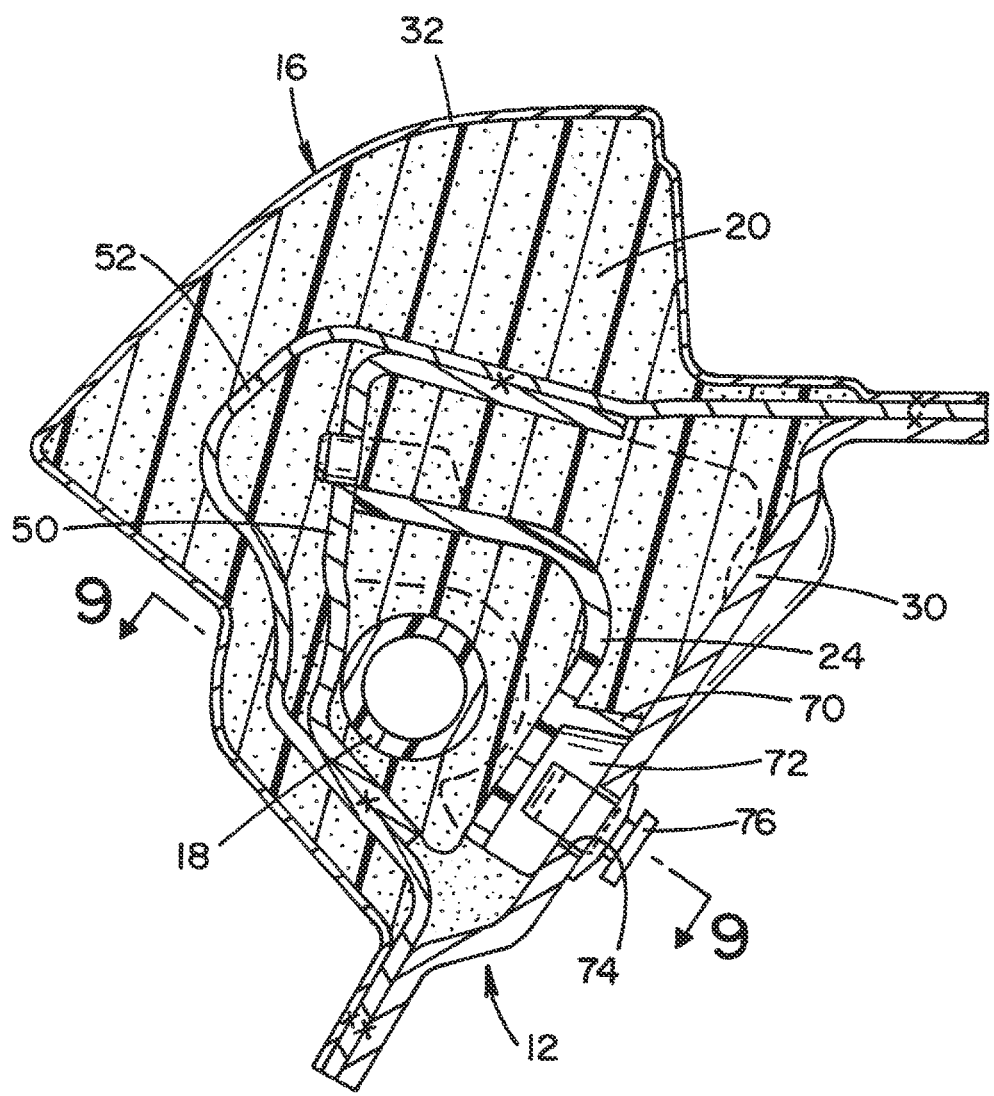
FIG. 7 is a cross-section view taken along the line 7-7 of FIG. 6.
Figure 8:
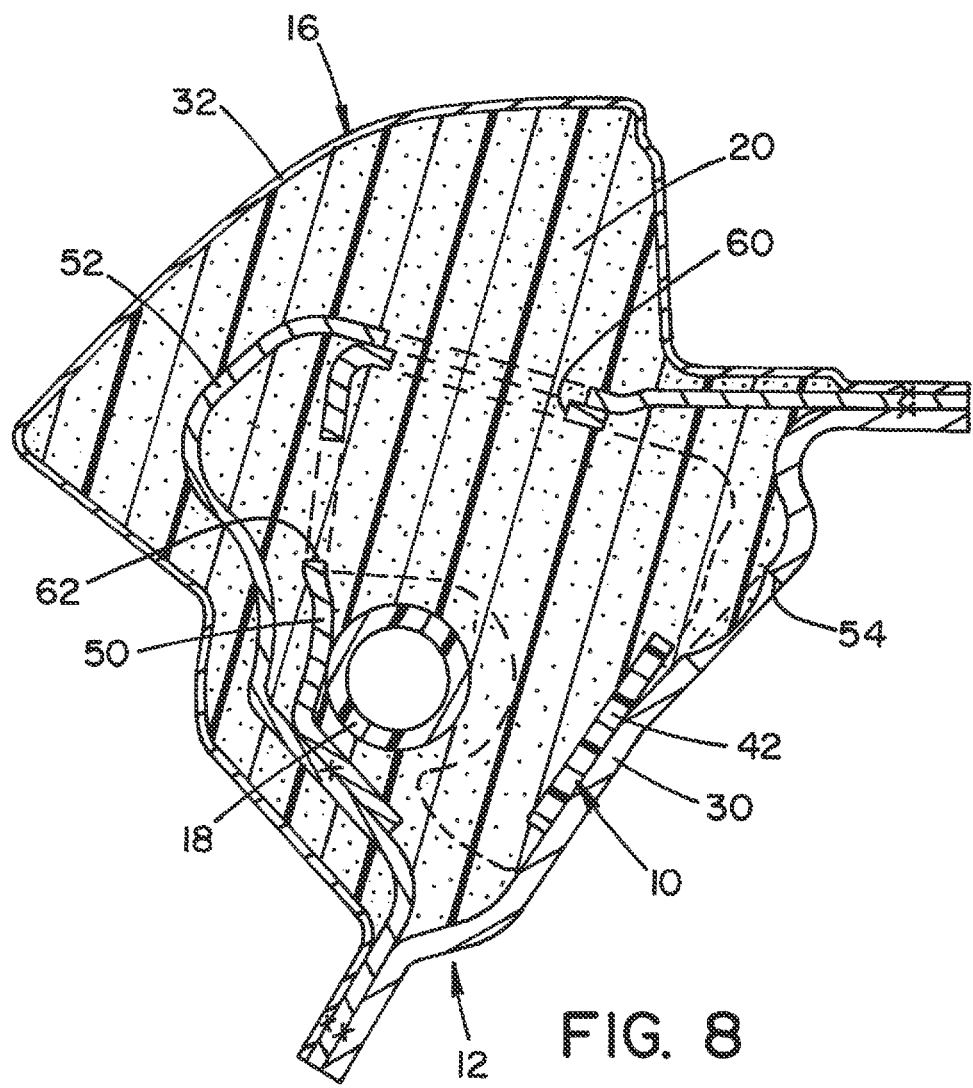
FIG. 8 is a cross-section view taken along the line 8-8 of FIG. 6.
Figure 9:
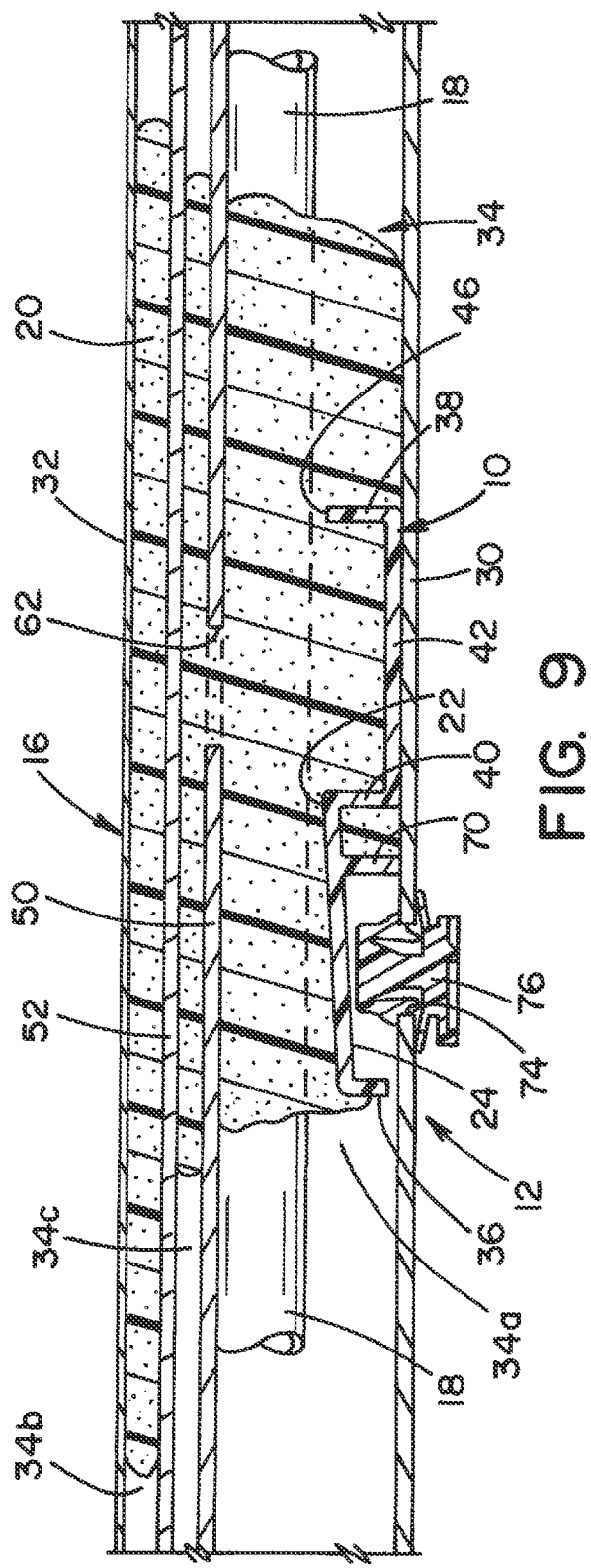
FIG. 9 is a cross-section view taken along the line 9-9 of FIG. 7.

Referring now to the drawings wherein the showings are for purposes of illustrating one or more exemplary embodiments and not for purposes of limiting the same, FIGS. 1-9 show an acoustic spray foam control baffle 10 and an acoustic spray foam control system 12 including the control baffle 10 mounted within a sunroof drain tube area 14 in a vehicle 16. In particular, FIG. 1 shows the control baffle in isolation. FIGS. 2-6 show the control baffle 10 mounted in the sunroof drain tube area 14 with a sunroof drain tube 18 installed. FIGS. 7-9 also show the control baffle 10 mounted in the sunroof drain tube area 14, but additionally show an acoustic spray foam 20 injected into the sunroof drain tube area 14.

Accordingly, the control system 12 includes the control baffle 10 mounted within the sunroof drain tube area 14 of vehicle 16, the sunroof drain tube 18 installed in the sunroof drain tube area 14 by passing through the control baffle 10, and the acoustic spray foam 20 injected into the sunroof drain tube area 14 with flow of the acoustic spray foam 20 controlled by the control baffle 10. As will be described in more detail below, the control baffle 10 includes a radial aperture 22 through which the sunroof drain tube 18 is threaded, wherein the radial aperture 22 is arranged to inhibit radial movement of the sunroof drain tube within the sunroof drain tube area 14, at least in one direction. As shown, the control baffle 10 can include a funnel-shaped section 24 disposed immediately upstream of the radial aperture 22 for guiding insertion of the sunroof drain tube 18 into and through the radial aperture 22.

In the illustrated embodiment, the control baffle 10 is provided for positioning with a pillar on the vehicle 16. For example, the control system 12 can include an inner pillar member 30 and an outer pillar member 32 fixed to the inner pillar member 30 (e.g., by welding) to together define an pillar on the vehicle 16 (e.g., an A-pillar, a C-pillar, a D-pillar, etc.). The inner and outer pillar members 30, 32 can also define a cavity 34 therebetween in which the control baffle 10 is complementarily received. Thus, the control baffle 10 is received within the cavity 34 defined in the pillar 30, 32 of the vehicle 16. The control baffle 10, as shown, can include spaced apart flange portions 36, 38 and 40 that complementarily fit within the cavity 34 to inhibit dispersal of the acoustic spray foam 20 past the flange portions 36, 38, 40 (e.g., longitudinally past the flange portions 36, 38, 40).

The flange portions 36, 38 can also be referred to as first and second end radial flanges that are provided for inhibiting dispersal of the acoustic spray foam 20 within the cavity 34 defined in the pillar 30, 32. Similarly, the flange portion 40 can also be referred to as a middle radial flange as it is disposed between and spaced apart from the first and second end radial flanges 36, 38. The funnel-shaped section 24 can be referred to as a first longitudinal section that is disposed between the first end radial flange 36 and the middle radial flange 40. A second longitudinal section 42 is disposed between the second end radial flange 38 and the middle radial flange 40. As best shown in FIG. 1, the first, second and middle radial flanges 36, 38, 40 define apertures (including the radial aperture 22) for accommodating the sunroof drain tube 18. In particular, the flange portion 36 defines an aperture 44, the flange portion 40 defines the radial aperture 22, and the flange portion 38 defines an aperture 46. At least one of the apertures 22, 44, 46 (and all of the apertures 22, 44, 46 in the illustrated embodiment) can be arranged to allow movement of the sunroof drain tube 18 relative to the first and second sections 24, 42 in only one direction, such as the direction illustrated by arrow 48 in FIG. 5. As already mentioned, the section 24 can be funnel-shaped for guiding the sunroof drain tube 18 through the radial aperture 22 during installation of the sunroof drain tube 18.

As shown, the control system 10 can additionally include at least one reinforcement member (e.g., inner reinforcement member 50 and outer reinforcement member 52) disposed between the inner and outer pillar members 30, 32 and fixedly secured to the inner and outer pillar members 30, 32. The inner pillar member 30 can define an injection inlet aperture 54 (FIGS. 2 and 5) into which the acoustic spray foam 20 is injected. The control baffle 10 is accommodated within an inner cavity 34a (i.e., a portion of the cavity 34) defined between the inner pillar member 30 and the at least one reinforcement member (e.g., reinforcement members 50, 52). By the arrangement of the flange portions 36, 38 and 40 and the longitudinal sections 24, 42, the control baffle 10 is configured such that injection of the acoustic spray foam 20 into the injection inlet aperture 54 via the illustrated injector 56 (FIG. 5) results in the acoustic spray foam 20 being received in the inner cavity 34a and an outer cavity 34b (i.e., another portion of the cavity 34) defined between the outer pillar member 32 and the at least one reinforcement member (e.g., reinforcement members 50, 52).

In the illustrated embodiment, the at least one reinforcement member includes the inner reinforcement member 50 and the outer reinforcement member 52, which are arranged to define a middle cavity 34c (i.e., yet another portion of the cavity 34) defined therebetween. The control baffle 12 is further configured such that injection of the acoustic spray foam 20 into the injection inlet aperture 54 results in the acoustic spray foam 20 being received in the inner cavity 34a, the outer cavity 34b and the middle cavity 34c defined between the inner and outer reinforcement members 50, 52. To facilitate such a result, the second longitudinal section 42 defines a recess or aperture 58 that allows the spray foam 20 to pass through the control baffle 10 and thereby fill the cavities 34a, 34b, 34c. In addition, to also facilitate such filling of the cavities 34a, 34b, 34c, the inner reinforcement member 50 can define apertures 60, 62 therethrough (see FIGS. 2 and 5) to enable filling of the middle cavity 34c and the outer cavity 34b.

Figure 2:
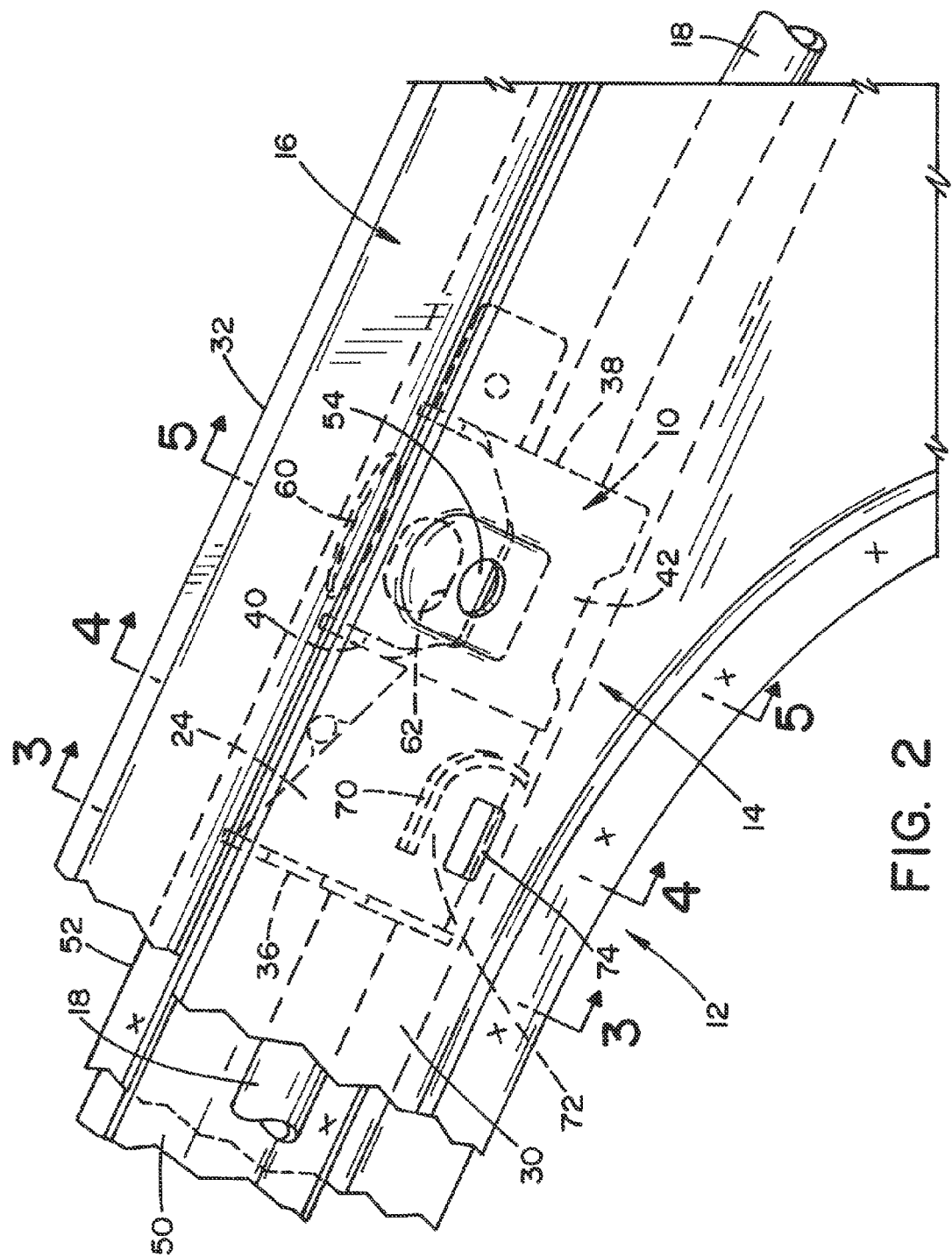
FIG. 2 is a partial perspective view of the acoustic spray foam control baffle of FIG. 1 mounted within the sunroof drain tube area on a vehicle shown with a sunroof drain tube installed and passing through the control baffle.
Figure 3:
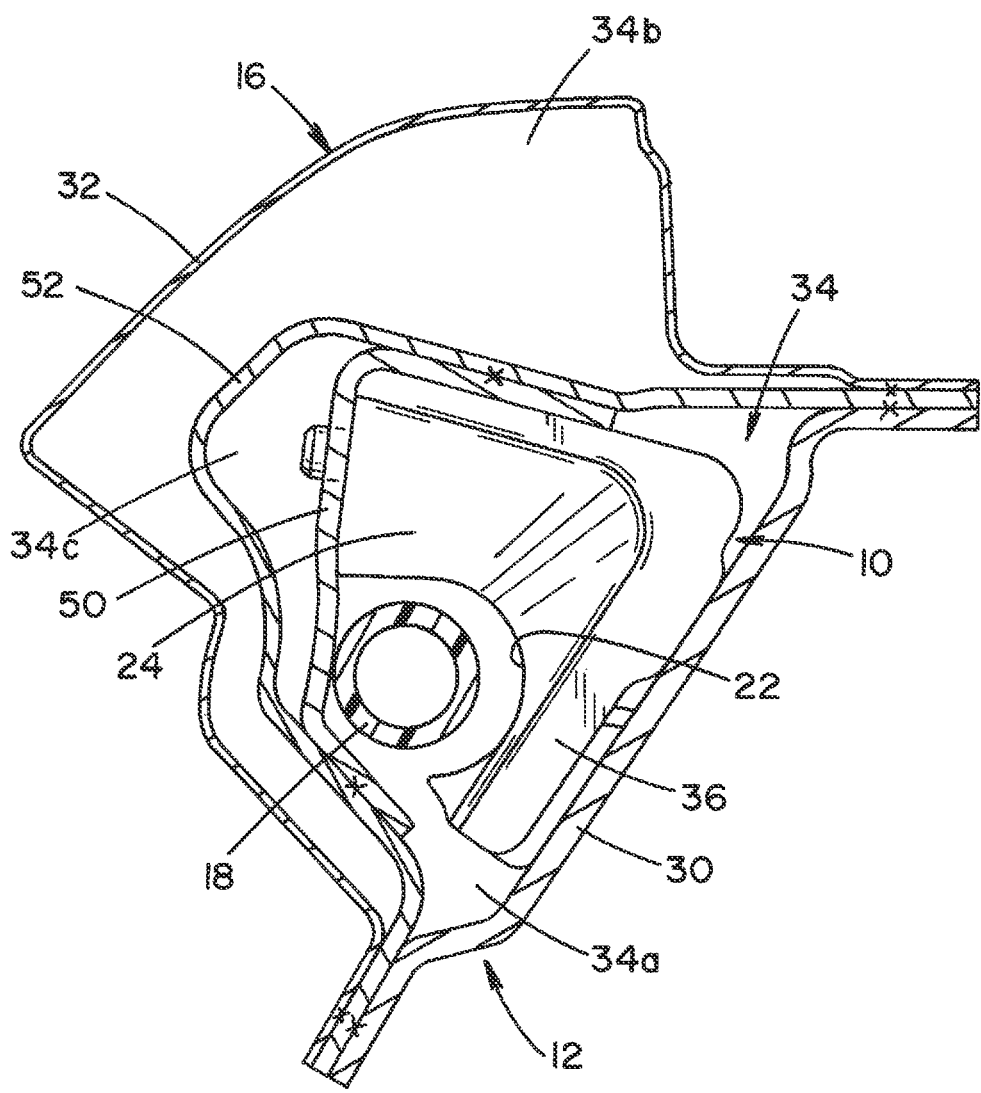
FIG. 3 is a cross-section view taken along the line 3-3 of FIG. 2.
Figure 4:
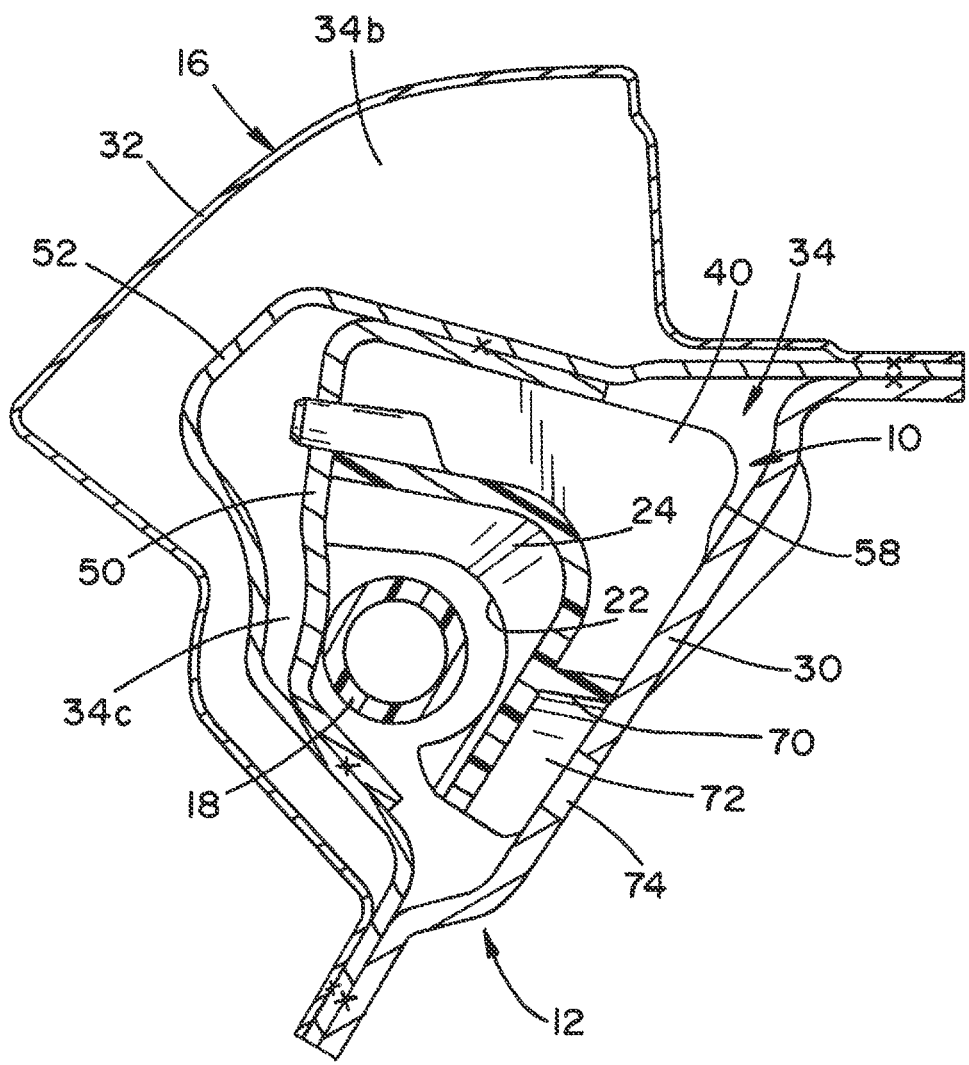
FIG. 4 is a cross-section view taken along the line 4-4 of FIG. 2.
Figure 5:
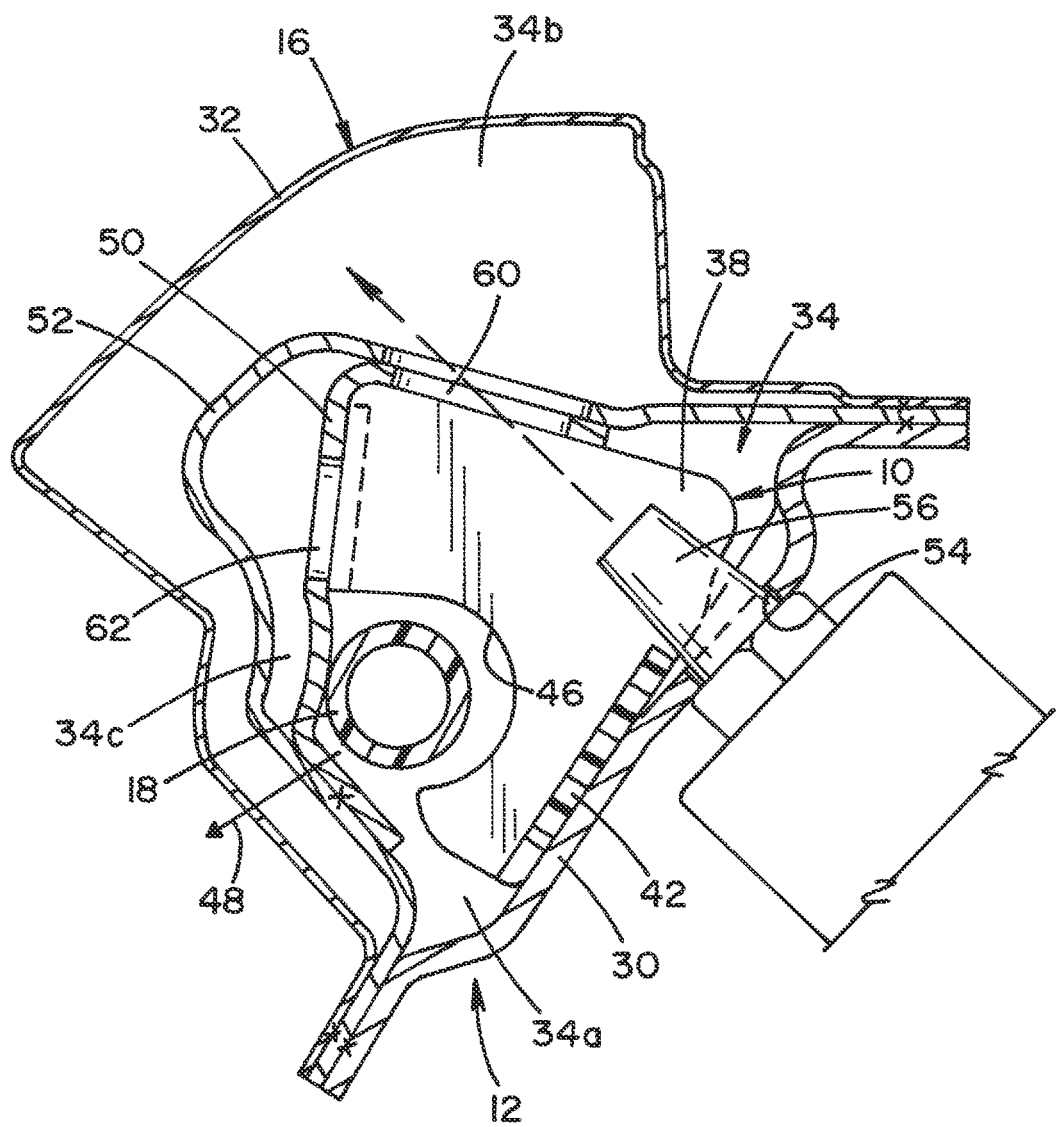
FIG. 5 is a cross-section view taken along the line 5-5 of FIG. 2 and showing an injector arranged to inject acoustic spray foam into the sunroof drain tube area.
Figure 6:
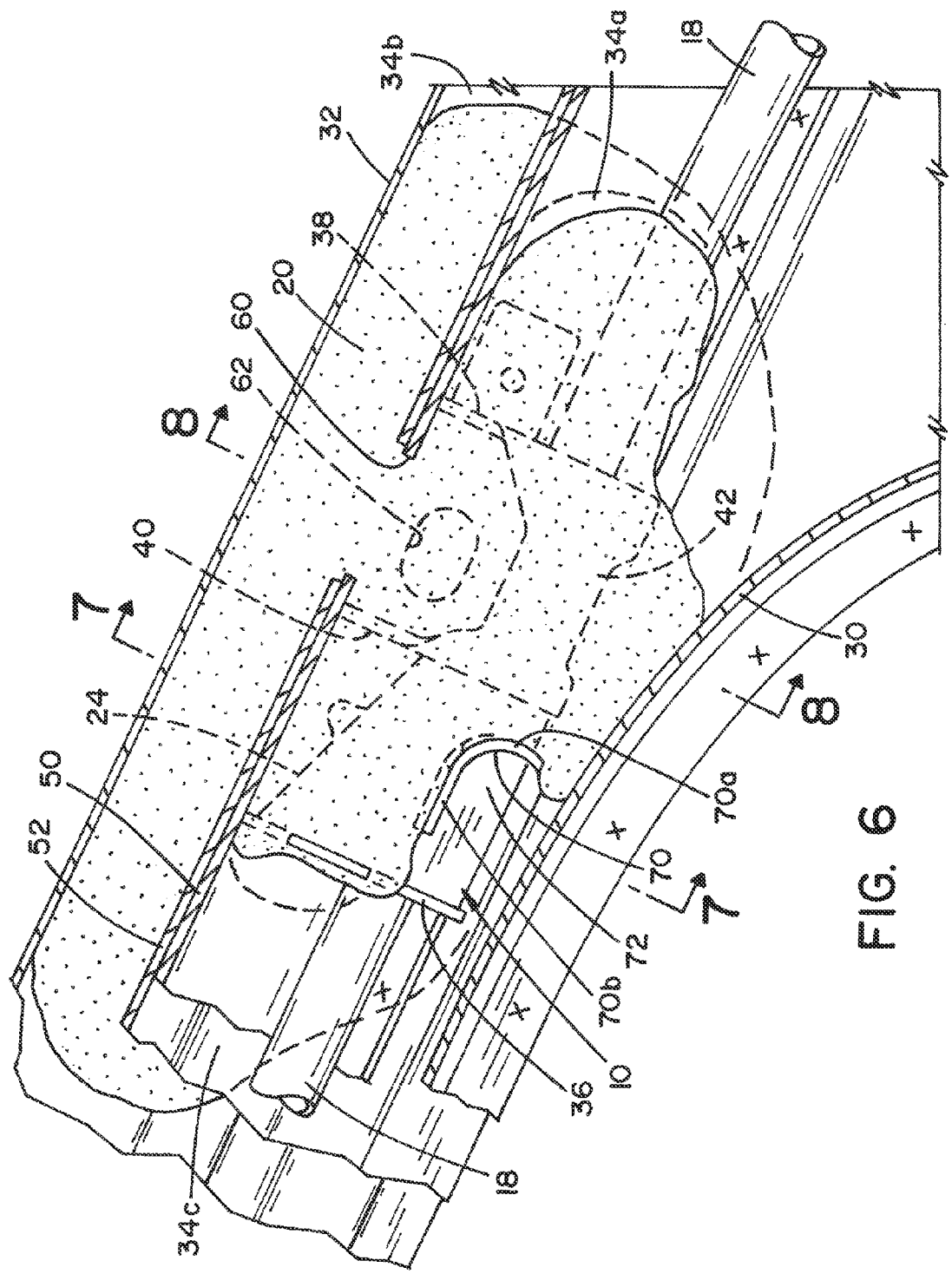
FIG. 6 is a cross-sectional view showing the sunroof drain tube area after the injector injects the acoustic spray foam into the sunroof drain tube area.

The control baffle 10 can further include a curved projecting flange 70 projecting radially outward from the first longitudinal section 24, which is disposed between the spaced apart flange portions 36, 40, for inhibiting dispersal of the acoustic spray foam 20 into an aperture area 72 disposed adjacent a fastener aperture 74 defined in the pillar 30, 32, and specifically defined in the inner pillar member 30 at a location spaced apart from the injector inlet aperture 54 (see FIG. 2). The curved projecting flange 70, which is also referred to herein as a shelf flange, is specifically arranged to inhibit flow of the acoustic spray foam 20 to the aperture area 72 disposed adjacent the fastener aperture 74 defined through the inner pillar member 30 on the pillar 30, 32. As best shown in FIG. 1, the curved projecting flange 70 extends outward from the first longitudinal section 24 and includes a curved section 70a and a longitudinally extending section 70b arranged between the injector inlet aperture 54 when the control baffle 10 is installed in the pillar 30, 32 and the fastener aperture 74 to inhibit dispersal of the spray foam 20 into the aperture area 72 defined immediately behind (i.e., inside the cavity 34) relative to the fastener aperture 74. Inhibiting flow of the acoustic spray foam 20 into this aperture area 72 enables the aperture 74 to function properly and be capable of receiving a suitable fastener, such as illustrated fastener 76 shown in FIGS. 7 and 9. In one embodiment, the fastener 76 functions as an attachment point for a wire harness, though this is not required and other uses for the fastener are contemplated (e.g., other uses may be employed and such uses may be dependent on vehicle layout).

Figure 10:
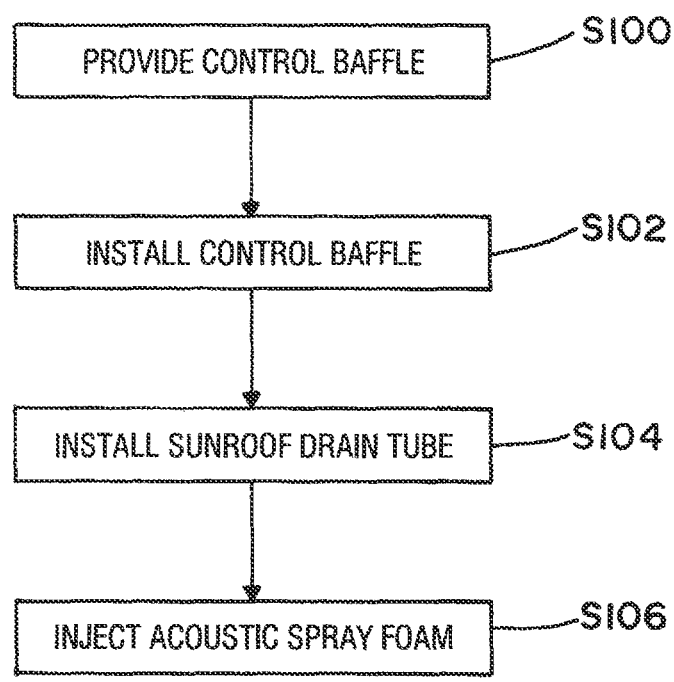
FIG. 10 is a process flow diagram illustrating an acoustic spray foam control method according to an exemplary embodiment.

With reference to FIG. 10, an acoustic spray foam control method for a sunroof drain tube area in a vehicle will now be described. In particular, the method of FIG. 10 will be described in association with the control system 12 and the control baffle 10 described hereinabove, though it is to be appreciated by those skilled in the art that the control method may be used with other control systems and/or control baffles. In the method, as shown in S100, the acoustic spray foam control baffle 10 configured for mounting within the sunroof drain tube area 14 is provided. As shown at S102, the control baffle 10 is installed within the sunroof drain tube area 14. The sunroof drain tube 18 is then installed at S104 into the sunroof drain tube area 14 by passing the sunroof drain tube 18 through the control baffle 10. With the control baffle 10 installed at S102 and the sunroof drain tube 18 installed at S104, the acoustic spray foam 20 can be injected into the sunroof drain tube area 14 at S106 with the control baffle 10 controlling the flow of the acoustic spray foam 20 within the sunroof drain control area 14.

Installing the sunroof drain tube 18 at S104 can include threading the sunroof drain tube 18 through the radial aperture 22 defined by the control baffle 10. More generally, installing the sunroof drain tube 18 at S104 can include threading the sunroof drain tube 18 through the apertures 22, 44 and 46. The funnel-shaped section 24, which is disposed immediately upstream of the radial aperture 22, can guide the sunroof drain tube 18 through the radial aperture 22. That is, the funnel-shaped section 24 can assist in passing the sunroof drain tube 18 through the radial aperture 22.

As already described, the control baffle 10 includes various features to control or contain dispersal of the acoustic spray foam 20 during injection of the acoustic spray foam 20 in S106. Such features include the radial flanges 36, 38 and 40, which contain longitudinal dispersal of the acoustic spray foam 20 when injected into the sunroof drain control area 14 at S106. The features also include the curved projecting flange 70, which is defined around the aperture area 72 at which the fastener 76 is mounted through a frame member (e.g., the inner pillar member 30) having the fastener aperture 74 defined there through. As already described herein, the curved projecting flange 70 inhibits the acoustic spray foam 20 from accumulating at the aperture area 72 during injection of the acoustic spray foam 20 in S104 and thereby causing an obstruction for the fastener 76. As also mentioned, the injection inlet aperture 54 through the inner pillar member 30 and the control baffle 10 can be arranged such that injection of the acoustic spray foam 20 in S106 through only the injection inlet aperture 54 can fill the inner cavity 34a, the outer cavity 34b and the middle cavity 34c.

Though not illustrated in FIG. 10, the method can additionally include installation of the fastener or fastener clip 76 through the fastener aperture 74 defined in the inner pillar member 30 after injecting the acoustic spray foam 20 in S106. The curved projecting flange 70 that curves around the fastener 74 can prevent the acoustic spray foam 20 from filling an area behind the fastener aperture 74 (i.e., the aperture area 72) to thereby enable the fastener 76 to be installed.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An acoustic spray foam control method for a sunroof drain tube area in a vehicle, comprising:
   providing an acoustic spray foam control baffle configured for mounting within the sunroof drain tube area;
   installing the acoustic spray foam control baffle within the sunroof drain tube area;
   installing a sunroof drain tube into the sunroof drain tube area by passing the sunroof drain tube through the acoustic spray foam control baffle; and
   injecting an acoustic spray foam into the sunroof drain tube area with the acoustic spray foam control baffle controlling the flow of the acoustic spray foam within the sunroof drain control area,
   wherein the acoustic spray control baffle includes a curved projecting flange defined around an aperture area at which a fastener is mounted through a frame member having a fastener aperture defined therethrough, the curved projecting flange inhibiting the acoustic spray foam from accumulating at the aperture area during injection of the acoustic spray foam.

2. The acoustic spray foam control method of claim 1 wherein installing the sunroof drain tube includes threading the sunroof drain tube through a radial aperture defined by the acoustic spray foam control baffle.

3. The acoustic spray foam control method of claim 2 wherein the acoustic spray foam control baffle includes a funnel-shaped section disposed immediately upstream of the radial aperture and threading the sunroof drain tube through the radial aperture includes the funnel-shaped section guiding the sunroof drain tube through the radial aperture.

4. The acoustic spray foam control method of claim 1 wherein the acoustic spray control baffle includes a plurality of radial flanges that are longitudinally spaced apart to contain longitudinal dispersal of the acoustic spray foam when injected into the sunroof drain control area.

5. An acoustic spray foam control method for a sunroof drain tube area in a vehicle, comprising:
   providing an acoustic spray foam control baffle configured for mounting within the sunroof drain tube area;
   installing the acoustic spray foam control baffle within the sunroof drain tube area;
   installing a sunroof drain tube into the sunroof drain tube area by passing the sunroof drain tube through the acoustic spray foam control baffle; and
   injecting an acoustic spray foam into the sunroof drain tube area with the acoustic spray foam control baffle controlling the flow of the acoustic spray foam within the sunroof drain control area,
   wherein the sunroof drain control area is defined by an outer pillar member, an inner pillar member and at least one reinforcement member disposed between the outer and inner pillar members, the inner pillar member defining an injection inlet aperture into which the acoustic spray foam is injected, and
   wherein the injection inlet aperture and the acoustic spray foam control baffle are arranged such that injection of the acoustic spray foam through only the injection inlet aperture fills an inner cavity defined between the inner pillar member and the at least one reinforcement member and an outer cavity defined between the outer pillar member and the at least one reinforcement member.

6. The acoustic spray foam control method of claim 5 wherein the acoustic spray control baffle includes a curved projecting flange defined around an aperture area at which a fastener is mounted through a frame member having a fastener aperture defined therethrough, the curved projecting flange inhibiting the acoustic spray foam from accumulating at the aperture area during injection of the acoustic spray foam.

7. The acoustic spray foam control method of claim 5 wherein the at least one reinforcement member includes in inner reinforcement member and an outer reinforcement member with a middle cavity defined between the inner and outer reinforcement members, and wherein the injection inlet aperture and the acoustic spray foam control baffle are arranged such that injection of the acoustic spray foam through only the injection inlet aperture fills the inner cavity defined between the inner pillar member and the inner reinforcement member, the outer cavity defined between the outer pillar member and the outer reinforcement member, and the middle cavity defined between the inner and outer reinforcement members.

8. The acoustic spray foam control method of claim 5 further including:
   installing a fastening clip through an aperture defined in the inner pillar member after injecting the acoustic spray foam, wherein the acoustic spray foam control baffle includes a projecting flange that curves around the aperture to prevent the acoustic spray foam from filling an area behind the aperture.

9. The acoustic spray foam control method of claim 4 wherein the plurality of radial flanges include:
   first and second end radial flanges for inhibiting dispersal of the acoustic spray foam; and
   a middle radial flange disposed between and spaced apart from the first and second end radial flanges.

10. An acoustic spray foam control system for a sunroof drain tube area in a vehicle, comprising:
    an acoustic spray foam control baffle mounted within the sunroof drain tube area of the vehicle;
    a sunroof drain tube installed in the sunroof drain tube area by passing through the acoustic spray foam control baffle;
    an acoustic spray foam injected into the sunroof drain tube area with flow of the acoustic spray foam controlled by the acoustic spray foam control baffle; and
    a curved projecting flange projecting radially outward from a first section of the acoustic spray foam control baffle disposed between a pair of the spaced apart flange portions for inhibiting dispersal of the acoustic spray foam into an aperture area disposed adjacent an fastener aperture defined in the pillar.

11. The acoustic spray foam control system of claim 10 wherein the acoustic spray foam control baffle includes a radial aperture through which the sunroof drain tube is threaded, the radial aperture arranged to inhibit radial movement of the sunroof drain tube within the sunroof drain tube area.

12. The acoustic spray foam control system of claim 11 wherein the acoustic spray foam control baffle includes a funnel-shaped section disposed immediately upstream of the radial aperture for guiding insertion of the sunroof drain tube into and through the radial aperture.

13. The acoustic spray foam control system of claim 10 wherein the acoustic spray foam control baffle is received within a cavity defined in a pillar of the vehicle, the acoustic spray foam control baffle includes said flange portions that are longitudinally spaced apart that complementarily fit within the cavity to inhibit dispersal of the acoustic spray foam past the flange portions.

14. An acoustic spray foam control system for a sunroof drain tube area in a vehicle, comprising:
an acoustic spray foam control baffle mounted within the sunroof drain tube area of the vehicle;
a sunroof drain tube installed in the sunroof drain tube area by passing through the acoustic spray foam control baffle;
an acoustic spray foam injected into the sunroof drain tube area with flow of the acoustic spray foam controlled by the acoustic spray foam control baffle;
an inner pillar member;
an outer pillar member fixed to the inner pillar member to define a cavity therebetween in which the acoustic spray foam control baffle is complementarily received; and
at least one reinforcement member disposed between the inner and outer pillar members and fixedly secured to the inner and outer pillar members, wherein the inner pillar member defines an injection inlet aperture into which the acoustic spray foam is injected, and wherein the acoustic spray foam control baffle is accommodated within an inner cavity defined between the inner pillar member and the at least one reinforcement member, and wherein the acoustic spray foam control baffle is configured such that injection of the acoustic spray foam into the injection inlet aperture results in the acoustic spray foam being received in the inner cavity and an outer cavity defined between the outer pillar member and the at least one reinforcement member.

15. The acoustic spray foam control system of claim 14 wherein the at least one reinforcement member includes an inner reinforcement member and an outer reinforcement member, and wherein the acoustic spray foam control baffle is configured such that injection of the acoustic spray foam into the injection inlet aperture results in the acoustic spray foam being received in the inner cavity, the outer cavity and a middle cavity defined between the inner and outer reinforcement members.

16. The acoustic spray foam control system of claim 14 wherein the acoustic spray foam control baffle further includes a curved projecting flange projecting radially outward from a first section of the acoustic spray foam control baffle disposed between a pair of the spaced apart flange portions for inhibiting dispersal of the acoustic spray foam into an aperture area disposed adjacent an fastener aperture defined in the pillar.

17. The acoustic spray foam control method of claim 13 wherein the longitudinally spaced apart flange portions include:
first and second end radial flanges for inhibiting dispersal of acoustic spray foam within the cavity defined in the pillar; and
a middle radial flange disposed between and spaced apart from the first and second end radial flanges.

18. An acoustic spray foam control baffle for positioning within a pillar on a vehicle, comprising:
first and second end radial flanges for inhibiting dispersal of acoustic spray foam within a cavity defined in the pillar;
a middle radial flange disposed between and spaced apart from the first and second end radial flanges;
a first longitudinal section disposed between the first end radial flange and the middle radial flange; and
a second longitudinal section disposed between the second end radial flange and the middle radial flange,
wherein the first, second and middle radial flanges define apertures for accommodating a sunroof drain tube.

19. The acoustic spray foam control baffle of claim 18, wherein the first section is funnel-shaped for guiding the sunroof drain tube through the apertures during installation of the sunroof drain tube, and wherein the first section includes a shelf flange arranged to inhibit flow of the acoustic spray foam to an aperture area disposed adjacent a fastener aperture defined on the pillar, and further wherein the apertures are arranged to allow movement of the sunroof drain tube relative to the first and second sections in only one direction.

* * * * *